(12) United States Patent
Morais et al.

(10) Patent No.: US 7,708,121 B1
(45) Date of Patent: May 4, 2010

(54) PISTON DUST BOOT SEAL FOR DISC BRAKE ASSEMBLY

(75) Inventors: Eduardo Morais, South Lyon, MI (US); Harry Miller, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 12/351,157

(22) Filed: Jan. 9, 2009

(51) Int. Cl.
*F16D 65/00* (2006.01)
(52) U.S. Cl. .................. 188/73.44; 188/73.45
(58) Field of Classification Search ........... 188/73.44, 188/73.45; 277/212 FB, 634–636
See application file for complete search history.

(56) References Cited

U.S. PATENT DOCUMENTS

| 4,447,066 | A | * | 5/1984 | Katagiri et al. | ............. 277/636 |
|---|---|---|---|---|---|
| 4,678,064 | A | * | 7/1987 | Adachi et al. | ............. 188/73.45 |
| 6,402,999 | B1 | * | 6/2002 | Sadr et al. | ............. 264/68 |
| 6,609,593 | B2 | * | 8/2003 | Ishii et al. | ............. 188/73.44 |
| 7,284,642 | B2 | * | 10/2007 | Macke et al. | ............. 188/73.44 |
| 7,537,721 | B2 | * | 5/2009 | Sueoka et al. | ............. 264/328.12 |

* cited by examiner

*Primary Examiner*—Christopher P Schwartz
(74) *Attorney, Agent, or Firm*—MacMillan, Sobanski & Todd, LLC (57) ABSTRACT

A disc brake system comprising a brake piston with an annular groove defined in an outer side wall of said piston disposed to slide within a cylinder. A dust boot seal made of a flexible material having a first end and a second end, the first end engaging an outboard end of the cylinder, the second end engaging the annular groove. A plurality of flexible convolutions provided in the dust boot seal between the first and second ends, and the second end defining one or more slots.

20 Claims, 6 Drawing Sheets

PISTON DUST BOOT SEAL FOR DISC BRAKE ASSEMBLY

BACKGROUND OF THE INVENTION

This invention relates in general to vehicle disc brake assemblies and in particular to an improved dust boot seal adapted for use in such vehicle disc brake assemblies.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor, which is secured to the wheel of the vehicle for rotation therewith. A caliper assembly is supported on pins, which are secured to an anchor bracket. The anchor bracket is secured to a non-rotatable component of the vehicle, such as the vehicle frame. The caliper assembly includes a pair of brake shoes, located on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the braking surfaces of the rotor. When the operator of the vehicle depresses the brake pedal, the piston urges the brake shoes from the non-braking position to the braking position causing their frictional engagement with the opposed braking surfaces of the rotor, thereby slowing or stopping rotation of the associated wheel of the vehicle.

A typical disc brake assembly also includes a dust boot seal. The dust boot seal is formed from a flexible material and has a first end, which engages an outboard end of the cylinder. A second end of the dust boot seal engages an annular groove formed in an outer side wall of the piston. A plurality of flexible convolutions is provided in the dust boot seal between the first and second ends thereof. The dust boot seal is provided to prevent water, dirt, and other contaminants from entering into the recess between the cylinder and the piston.

SUMMARY OF THE INVENTION

This invention relates to an improved dust boot seal adapted for use in such vehicle disc brake assemblies. More specifically, the invention relates to a disc brake system comprising a brake piston with an annular groove defined in an outer side wall of said piston disposed to slide within a cylinder. A dust boot seal made of a flexible material having a first end and a second end, the first end engaging an outboard end of the cylinder, the second end engaging the annular groove. A plurality of flexible convolutions provided in the dust boot seal between the first and second ends, and the second end defining one or more slots.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
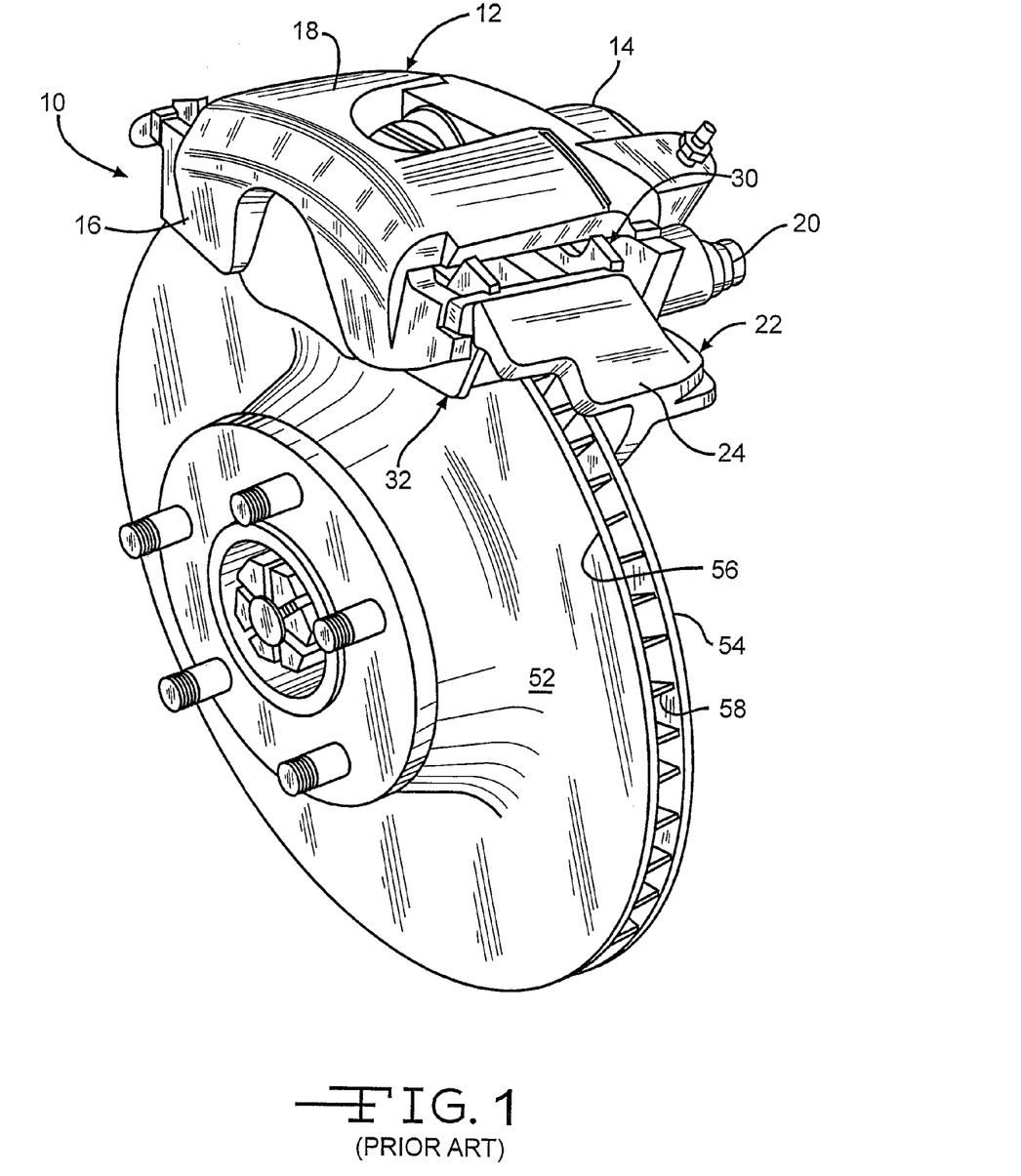
FIG. 1 is a perspective view of a portion of a prior art vehicle disc brake assembly.
Figure 2:
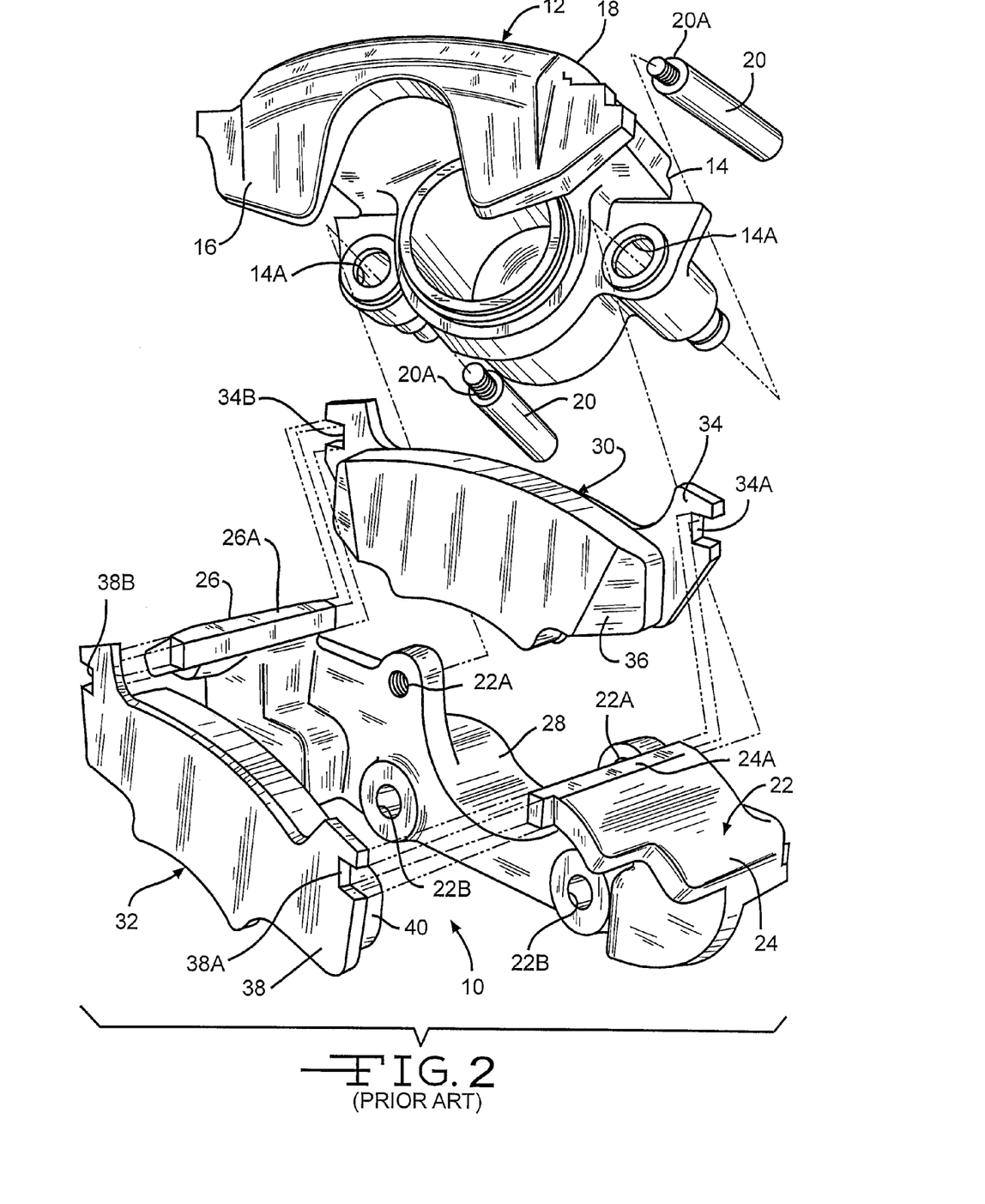
FIG. 2 is an exploded perspective view of selected components of the prior art vehicle disc brake assembly illustrated in FIG. 1.
Figure 3:
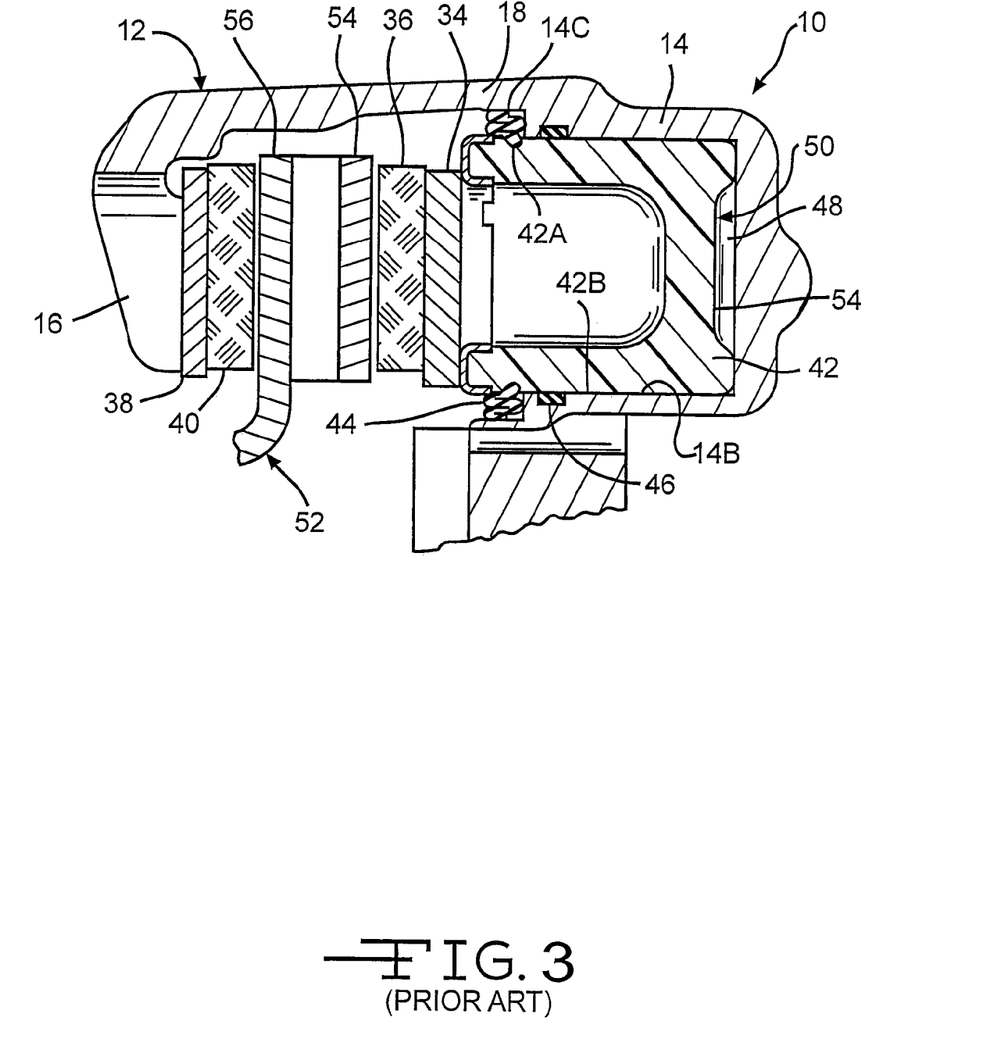
FIG. 3 is a sectional elevation view of a portion of the prior art disc brake assembly illustrated in FIG. 1.

Referring now to the drawings, there is illustrated in FIGS. 1 through 3 a portion of a prior art vehicle disc brake assembly, indicated generally at 10. The general structure and operation of the prior art disc brake assembly 10 is conventional in the art. Thus, only those portions of the prior art disc brake assembly 10 that are necessary for a full understanding of this disclosure will be explained and illustrated. Although this invention will be described and illustrated in connection with the particular kind of vehicle disc brake assembly 10 disclosed herein, it will be appreciated that this invention may be used in connection with other kinds of disc brake assemblies if so desired.

As shown in prior art FIG. 1, the disc brake assembly 10 is a sliding type of disc brake assembly and includes a generally C-shaped caliper, indicated generally at 12. The caliper 12 includes an inboard wall portion 14 and an outboard wall portion 16, which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle, for example, an axle flange (not shown), when the disc brake assembly 10 is installed at a rear wheel; or a steering knuckle (not shown), when the disc brake assembly 10 is installed at a front wheel.

The pins 20 extend through non-threaded apertures 14A formed in the inboard wall 14 of the caliper 12. Each pin 20 has a threaded end 20A, which is received in a threaded aperture 22A provided in anchor bracket 22. The pins 20 support the caliper 12 for sliding movement relative to the anchor bracket 22 in both the outboard direction (leftward when viewing FIG. 3) and the inboard direction (rightward when viewing FIG. 3). Such sliding movement of the caliper 12 occurs when the disc brake assembly 10 is actuated, as will be explained below. A pair of bolts (not shown) extends through a pair of non-threaded apertures 22B formed in the anchor bracket 22 to secure the anchor bracket 22 to the stationary vehicle component. Alternatively, other known securing methods can be used to secure the anchor bracket 22 to the stationary vehicle component.

As best shown in FIG. 2, the anchor bracket 22 includes a pair of axially and outwardly extending arms 24 and 26, which are interconnected at their inboard ends by an inner tie bar 28. The arms 24 and 26 have upstanding guide rails 24A and 26A respectively formed thereon. The guide rails 24A and 26A extend transverse to the arms 24 and 26, respectively, and parallel to one another. The guide rails 24A and 26A support an inboard brake shoe 30 and an outboard brake shoe 32, respectively, which slide on the guide rails.

The inboard brake shoe 30 includes a backing plate 34 and a friction pad 36. The inboard backing plate 34 includes opposed ends having notches 34A and 34B formed therein, which engage the guide rails 24A and 26A of the anchor bracket 22 and support the inboard brake shoe 30 thereon. The outboard brake shoe 32 includes a backing plate 38 and a friction pad 40. The outboard backing plate 38 includes opposed ends having notches 38A and 38B formed therein, which engage the guide rails 24A and 26A of the anchor bracket 22 and support the outboard brake shoe 32 thereon. Alternatively, the inboard brake shoe 30 can be supported on a brake piston of the prior art disc brake assembly 10, while the outboard brake shoe 32 can be supported on the outboard wall portion 16 of the caliper 12.

An actuation means, indicated generally at 50 in FIG. 3, is provided for effecting the operation of the disc brake assembly 10. The actuation means 50 includes a brake piston 42, which is disposed in a cylinder or recess 14B, bored in the outboard surface of the inboard wall 14 of the caliper 12. The actuation means 50, shown in this embodiment as being a hydraulic actuation means, operates to move the piston 42 within the recess 14B in the outboard direction (leftward when viewing FIG. 3). However, other types of actuation means 50, such as electrical, pneumatic, and mechanical types, can be used.

The prior art disc brake assembly 10 also includes a dust boot seal 44 and an annular fluid seal 46. The dust boot seal 44 is formed from a flexible material and has a first end, which engages an outboard end of the recess 14B. A second end of the dust boot seal 44 engages an annular groove formed in an outer side wall of the piston 42. A plurality of flexible convolutions is provided in the dust boot seal 44 between the first and second ends thereof. The dust boot seal 44 is provided to prevent water, dirt, and other contaminants from entering into the recess 14B. The fluid seal 46 is disposed in an annular groove formed in a side wall of the recess 14B and engages the radial outer surface of the piston 42. The fluid seal 46 is provided to define a sealed hydraulic actuator chamber 48, within which the piston 42 is disposed for sliding movement. Also, the fluid seal 46 is designed to function as a "roll back" seal to retract the piston 42 within the recess 14B (rightward when viewing FIG. 3) when the brake pedal is released.

The prior art disc brake assembly 10 further includes a brake rotor 52, which is secured to a wheel (not shown) of the vehicle for rotation therewith. The illustrated brake rotor 52 includes a pair of opposed friction discs 54 and 56, which are spaced apart from one another by a plurality of intermediate fins or posts 58 in a known manner. The brake rotor 52 extends radially outward between the inboard friction pad 36 and the outboard friction pad 40.

When it is desired to actuate the prior art disc brake assembly 10 to retard or stop rotation of the brake rotor 52 and the vehicle wheel secure to the rotor, the driver of the vehicle depresses the brake pedal (not shown). In a manner that is well known in the art, depression of the brake pedal causes pressurized hydraulic fluid to be introduced into the cylinder 48. The pressurized hydraulic fluid urges the piston 42 in the outboard direction (toward the left when viewing art FIG. 3) into engagement with the backing plate 34 of the inboard brake shoe 30. As a result, the friction pad 36 of the inboard brake shoe 30 is moved into frictional engagement with the inboard friction disc 54 of the brake rotor 52. At the same time, the caliper 12 slides on the pins 20 in the inboard direction (toward the right when viewing art FIG. 3) such that its outboard wall 16 moves the friction pad 40 of the outboard brake shoe 32 into frictional engagement with the outboard friction disc 56 of the brake rotor 52. As a result, the opposed friction discs 54 and 56 of the brake rotor 52 are frictionally engaged by the respective friction pads 36 and 40 to slow or stop rotation of the brake rotor 52 and wheel. The structure and operation of the prior art disc brake assembly 10 thus far described is conventional in the art.

Figure 4:
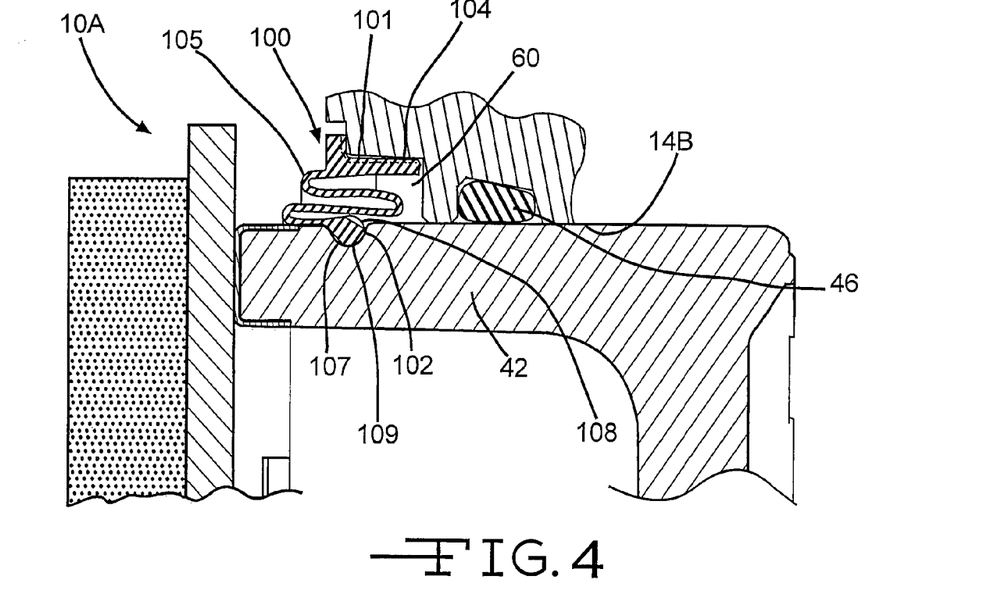
FIG. 4 is a section view of a portion of a vehicle disc brake assembly, including a first embodiment of a dust boot seal, the disc brake assembly being shown in a non-actuated position.
Figure 5:
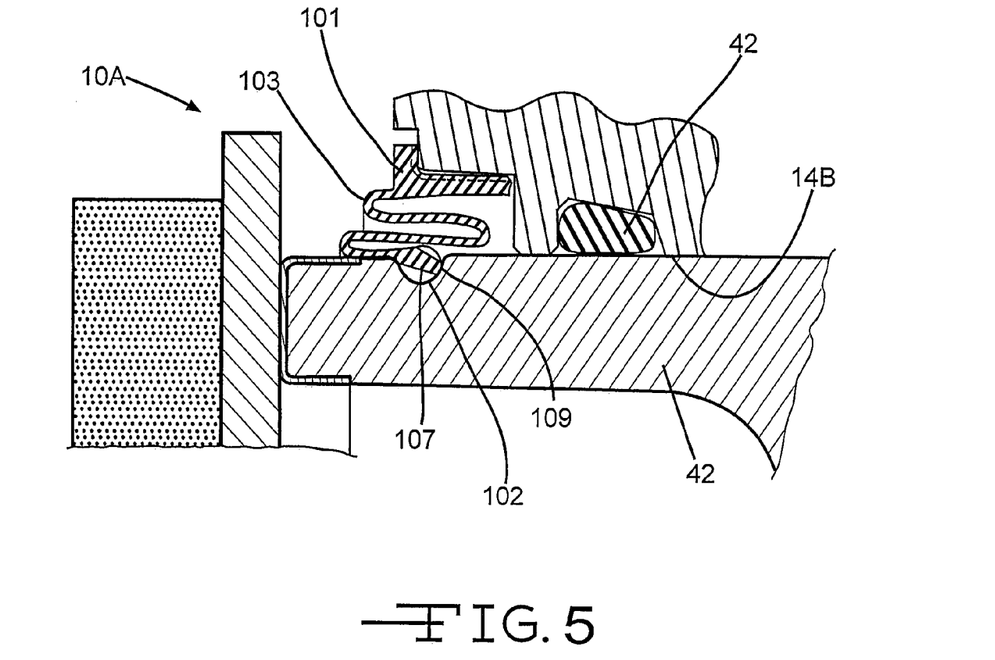
FIG. 5 is another section view of the portion of the vehicle disc brake assembly including the first embodiment of the dust boot seal, the disc brake assembly being shown in a non-actuated position.
Figure 6:
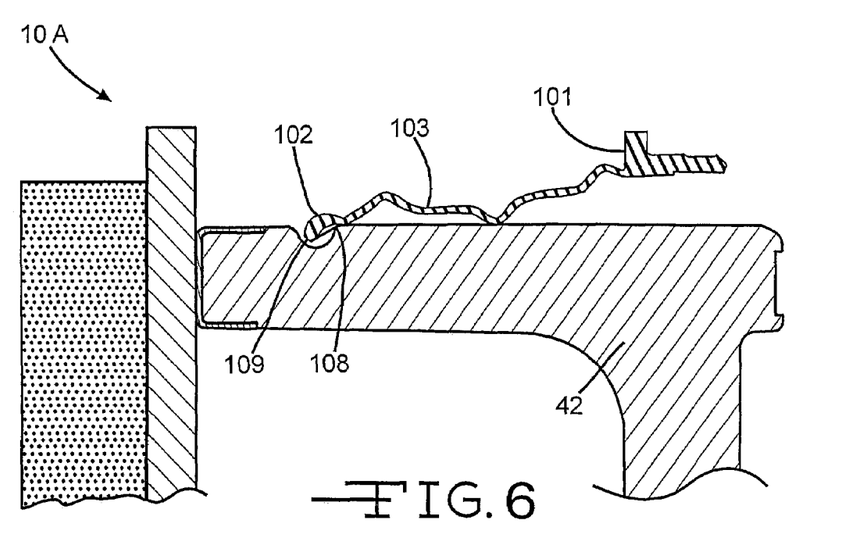
FIG. 6 is yet another sectional view of the portion of the vehicle disc brake assembly including the first embodiment of the dust boot seal, the disc brake assembly being shown in an actuated position.

Referring now to FIGS. 4 through 6 and using like reference numbers to indicate corresponding parts, there is illustrated a portion of a vehicle disc brake assembly, indicated generally at 10A, including a first embodiment of a dust boot seal, indicated generally at 100. The dust boot seal 100 is provided to prevent water, dirt, and other contaminants from entering into a space 60 defined between the recess 14B, the piston 42 and the dust boot seal 100. Although this embodiment will be described and illustrated in connection with the particular kind of vehicle disc brake assembly 10A disclosed herein, it will be appreciated that this invention may be used in connection with other kinds of disc brake assemblies if so desired. For example, this invention may be used in connection with a disc brake assembly such at that shown in U.S. Pat. No. 7,299,903 to Rockwell et al. and U.S. Pat. No. 6,729,444 to Schmandt et al, the disclosure of each of these patents incorporated by reference in entirety herein.

Figure 7:
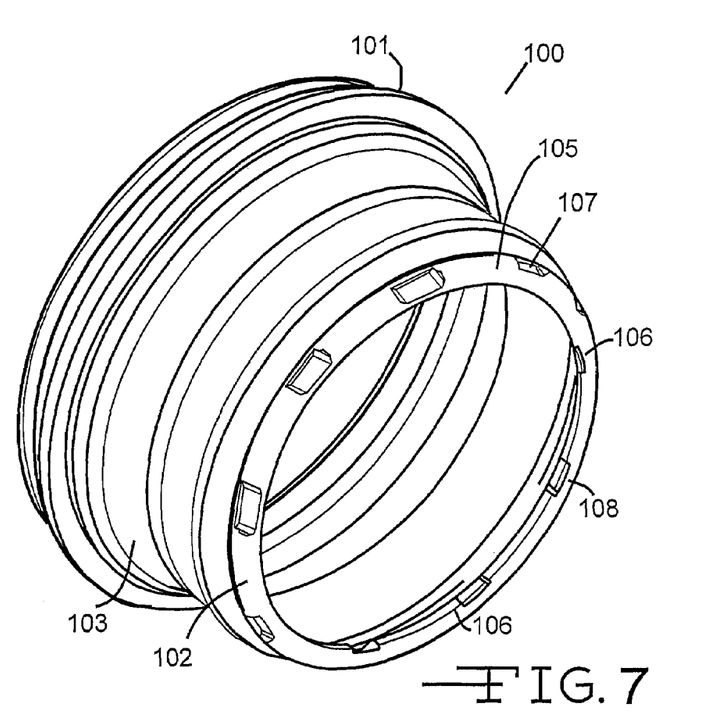
FIG. 7 is a perspective view of the first embodiment of the dust boot seal illustrated in FIGS. 4-6, the dust boot seal being shown in an uninstalled or extended condition.

Disc brake assembly 10A includes a dust boot seal 100. The dust boot seal 100 is provided to prevent water, dirt, and other contaminants from entering into the recess 14B. In the illustrated embodiment, the dust boot seal 100 is formed of a flexible material. As best shown in FIG. 7, which shows the illustrated embodiment of the dust boot seal 100 in its unassembled condition, dust boot seal 100 has a first or outboard end 101, a second or inboard end 102, and a main body 103 extending between the first end 101 and the second end 102.

Referring again to FIG. 4, in the illustrated embodiment the first end 101 is generally L-shaped in cross-section and is adapted to engage or be disposed in an outboard stepped end 14C of the recess 14B. In the illustrated embodiment, the dust boot seal 100 is a press-in dust boot seal and the first end 101 thereof includes a steel ring 104 (shown in phantom in FIGS. 4-6). The steel ring 104 is provided for reinforcement to provide better engagement of the first end 101 with the outboard stepped end 14C of the recess 14B. Alternatively, the construction of the first end 101 of the dust boot seal 100 can be other than illustrated if so desired. For example, the first end 101 can have a different configuration from that illustrated and/or the steel ring 104 is not necessary.

In the illustrated embodiment, the second end 102 is generally circular in cross-section, and is adapted to engage or be disposed in an annular groove 42A formed in an outer side wall 42B of the piston 42. The second end 102 includes an outer circumference or surface 105 and an inner circumference or surface 106. As is best seen in FIG. 7, in the illustrated embodiment the second end 102 includes a plurality of first or "outer" slots 107 formed on the outer circumference 105 thereof and a plurality of second or "inner" slots 108 formed on the inner circumference 106 thereof.

In the illustrated embodiment, the dust boot seal 100 includes nine equally-spaced outer slots 107. Each of the illustrated outer slots 107 is the same size and shape. The illustrated outer slots 107 are generally tapered-sided prism-shaped voids formed in the outer circumference 105 of the second end 102.

In the illustrated embodiment, the dust boot seal 100 includes nine equally-spaced inner slots 108. Each of the illustrated inner slots 108 is the same size and shape. The illustrated inner slots 108 are generally straight-sided, semi-cylindrical voids formed in the inner circumference 106 of the second end 102. Alternatively, the configuration and/or the spacing of the slots 107 and/or 108 can be other than illustrated if so desired. For example, the slots 107 and/or 108 can have any desired shape, such as for example, cross-sections that are triangular, rectangular, arc-shaped, irregular or any other shape. Further, the slots 107 and/or 108 can have a non-uniform spacing between adjacent slots. Although at least three outer slots 107 and three inner slots 108 are illustrated provided, the actual number of slots 107 and/or 108 could be less than three or more than the illustrated nine if so desired.

In the illustrated embodiment, the outer slots 107 and the inner slots 108 each penetrate approximately 30% of the thickness of the second end 102. Alternatively, the outer slots 107 and/or the inner slots 108 could penetrate from about 5% to about 40% of the thickness of second end 102. Also, if desired, the outer slots 107 and inner slots 108 could penetrate the second end 102 to different depths. Further, one or more of the outer slots 107 could penetrate to a different depth than other ones of the outer slots 107 and/or one or more of the inner slots 108 could penetrate to a different depth than other ones of the inner slots 108.

The illustrated outer slots 107 generally cover approximately one-third of a surface area of outer circumference 105 of the second end 102. That is, the length of surface between one outer slot 107 and the next one is about twice the length of one outer slot 107. This is not necessary for the operation of the dust boot seal 100. Outer slots 107 could cover a greater or lesser amount of the surface area of the outer circumference 105 of the second end 102. A similar range would also be acceptable for inner slots 108.

Figure 9:
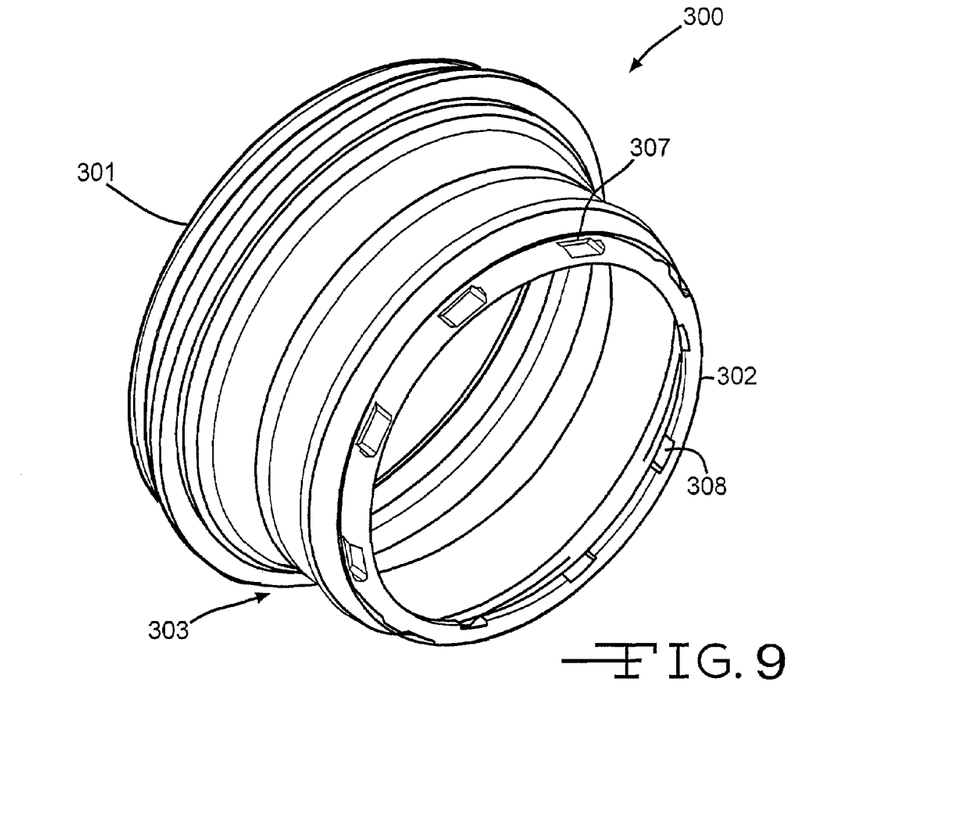
FIG. 9 is a perspective view of a third embodiment of a dust boot seal, the dust boot seal being shown in an uninstalled or extended condition.

In the illustrated embodiment, each outer slot 107 corresponds to an inner slot 108. That is, each outer slot 107 has a circumferentially located matching inner slot 108. Alternatively, the outer slots 107 can have no correlation to the inner slots 108. The number of the outer slots 107 can differ from the number of the inner slots 108. For example, FIG. 9 illustrates a third embodiment of a dust boot seal, indicated generally at 300. The dust boot seal 300 shares many of the same elements as dust boot seal 100. However, in this embodiment of the dust boot seal 300, the outer slots 304 and inner slots 305 are staggered on second end 302. In other words, each outer slot 304 is located circumferentially approximately halfway between each adjacent pair of the inner slots 305.

Figure 8:
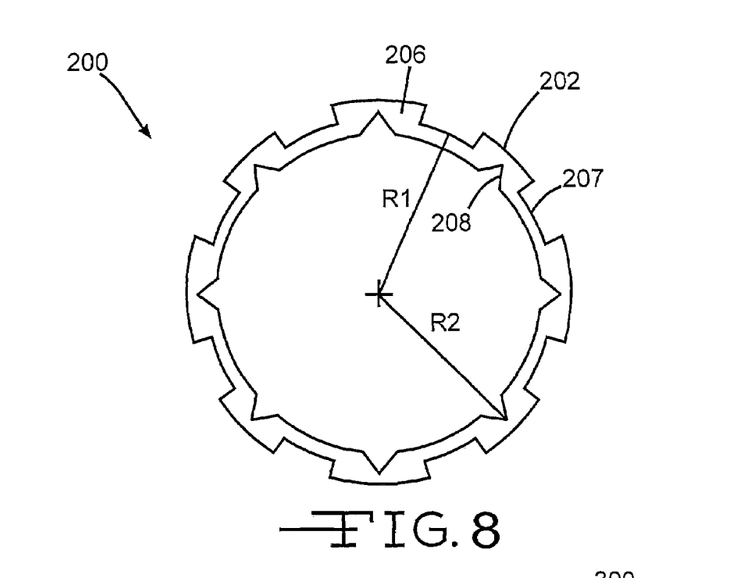
FIG. 8 is an elevational end view of a second end of a second embodiment of a dust boot seal.

Referring again to FIG. 7, second end 102 of the dust boot seal 100 defines a contact or sealing surface 109. In the illustrated embodiment, the contact surface 109 is a continuous, uninterrupted sealing surface portion at a remote end 110 of the second end 102 that is not impinged by either any of the outer slots 107 or the inner slots 108. In other words, the outer slots 107 never meet any inner slot 108 and thus, the illustrated contact surface 109 is continuous along the remote end of second end 102. Alternatively, one or more outer slot 107 could intersect one or more inner slot 108, causing interruptions in the contact surface 109. Alternatively, the outer slots 108 and/or the inner slots 107 could be configured such that there is no continuous contact surface 109. For example, as shown in the embodiment of FIG. 8, which is an end-view of a second end 202 of a second embodiment of the dust boot seal, indicated generally at 200, a radius R1 defined by a plurality of outer slots 204 is less than a radius R2 defined by a plurality of inner slots 205.

In the illustrated embodiment, the main body 103 has a generally uniform cross section, and includes a plurality of flexible convolutions, best seen in FIG. 4. The flexible convolutions of the main body 103 allow the main body 103 to unfold (and refold), so that the first end 101 and the second end 102 can move apart from each other, as shown in FIG. 6. Although the main body 103 is illustrated with three convolutions, this is not necessary, and the main body 103 can have a different number of convolutions. Alternatively, the main body 103 can have a different configuration from that illustrated, including a non-uniform cross-section and/or can be provided without any convolutions if so desired.

Referring to FIGS. 4 through 6, the operation of the disc brake assembly 10A at different points of actuation/operation will be discussed. As shown in FIGS. 4-6, the first end 101 of dust boot seal 100 remains engaged with the outboard end 14C of the recess 14B during the operation of the disc brake assembly 10A. The second end 102 remains engaged with the annular groove formed in an outer side wall of the piston 42, but rotates within the annular groove 42A as will be discussed below in detail. The outer slots 107 and inner slots 108 are provided to allow the dust boot seal 100 to reduce a pressure differential exerted across the dust boot seal 100. When a pressure differential exists across the dust boot seal 100, the dust boot seal 100 will deform. As a result of sufficient deformation of the dust boot seal 100, the outer slots 107 or the inner slots 108 will provide fluid communication between the two sides, namely an interior side 112 and an exterior side 113 of the dust boot seal 100 of the dust boot seal 100. The operation of dust boot seal 100 is explained in reference to the following figures.

FIG. 4 illustrates the dust boot seal 100 in the vehicle disc brake assembly 10A when the disc brake assembly 10A is not actuated. In this condtion, the dust boot seal 100 is in its normal unactuated position. As shown therein, in this position the second end 102 is disposed within the annular groove/of the piston 42 whereby the contact surface 109 of the dust boot seal 100 is in contact with piston 42 and provides a continuous or complete seal therewith.

FIG. 5 illustrates the dust boot seal 100 when the disc brake assembly 10 is not actuated but there is an above normal or an increased amount of air pressure in an interior space 60 defined between the piston bore 14B, the piston 42, and the interior side 112 of the dust boot seal 100. As shown therein, the disc brake assembly 10A is not actuated but the formation of the increased amount of air pressure in space 60 causes the dust boot seal 100 to expand. This expansion causes the second end 102 of the dust boot seal 100 to rotate counter clockwise as indicated by arrow 114, in FIG. 5. As the second end 102 rotates, the contact surface 109 is moved out of contact with the piston 42 in the area of the outer slots 107. This allows air from the space 60 to escape or vent to the outside or atmosphere through the outer slots 107 thereby reducing the pressure in the space 60. As a result, once the pressure is vented, the dust boot seal 100 returns to the normal operating condition illustrated in FIG. 4 whereby the contact surface 109 of the dust boot seal 100 is in contact with piston 42 and provides a continuous or complete seal therewith.

FIG. 6 illustrates dust boot seal 100 when the disc brake assembly 10A is actuated and there is below normal or reduced pressure in space 60. In FIG. 6, the disc brake assembly 10A is actuated and the piston 42 is moved or shifted to the left in the drawing to engage the brake shoes 30 and 32 and the dust boot seal 100 is extended via the convolutions 103. As this occurs, a vacuum may form in the space 60. As a result, the dust boot seal 100 deforms, and second end 102 rotates clockwise as indicated by arrow 115 in FIG. 7. As second end 102 rotates, the contact surface 109 is moved out of contact with the piston 42 in the area of the inner slots 108. This allows air from the atmosphere to travel through the inner slots 108 to the space 60, reducing the vacuum inside space 60 and to equalize the pressure in the space 60 to atmospheric pressure. As a result, once the pressure restored, the dust boot seal 100 returns to the normal operating condition illustrated in FIG. 4 whereby the contact surface 109 of the dust boot seal 100 is in contact with piston 42 and provides a continuous or complete seal therewith.

In either mode of operation described above in FIGS. 5 and 6, the contact surface 109 will remain displaced from the piston 42 until a maximum pressure differential is achieved between the two sides of the dust boot seal 100. When that maximum pressure difference is reached, the second end 102 will move back into place, and contact surface 109 will provide a seal with the piston 42. This will prevent further air communication between environment and space 60. The magnitude of this maximum pressure difference will depend on the materials and dimensions of dust boot seal 100.

The illustrated embodiments of the dust boot seal 100, 200, and 300 solve problems associated with the prior art dust boot seal 44 of the prior art disc brake assembly 10. When the prior art disc brake assembly 10 is operated, friction between the friction discs 54 and 56 and the friction pads 36 and 40 creates heat. This increases the temperature of components of the prior art disc brake assembly 10. If the prior art dust boot seal 44 contacts heated components, the dust boot seal 44 can be damaged, and will no longer be able to function for its intended purpose of preventing dust and dirt from entering into the recess 14B. With the prior art dust boot seal 44, it is also possible for a vacuum to be formed in a space 60A, which is defined between the piston 42, the dust boot seal 44 and the recess 14B, as the piston 42 is moved to the left in prior art FIG. 3 during brake operation. The trapped vacuum can cause the dust boot seal 44 to come off of the annular groove in the piston 42 and ride on an outer diameter portion of the piston 42. Additionally, gasses can form in space 60A and cause the prior art dust boot seal 44 to expand to such an extent that the dust boot seal 44 may touch the backing plate 34 causing the dust boot seal 44 to get damaged or burned.

Also, when the friction pad 36 and 40 are worn down from use, these pads will be replaced. In order to accommodate new, thicker pads, the piston 42 is pushed back into the recess 14B. It is possible that during this service, air can be trapped in space 60A behind the prior art dust boot seal 44. The trapped air would cause the prior art dust boot seal 44 to expand from its normal position, which in turn may cause the prior art dust boot seal 44 to touch the backing plate 34, causing the dust boot seal 44 to become damaged or burned.

The illustrated embodiments of the dust boot seal 100, 200, and 300 solve the above problems associated with the prior art dust boot seal 44 by allowing the pressure in the space 60 to equilibrate with atmospheric air pressure. This prevents the dust boot seal 100 from being displaced by pressure differentials, and reduces the potential opportunities for damaging the dust boot seal 100.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A disc brake assembly comprising:
a caliper having a recess formed therein;
a piston slidably disposed in said recess, said piston having an annular groove formed in an outer side wall thereof;
a flexible dust boot seal having a first end and a second end, said first end disposed in an outboard end of said recess and the second end disposed in said annular groove of said piston; and
a fluid seal disposed between said caliper and said piston to define a sealed chamber between said piston and said recess;
wherein said second end of said dust boot seal is generally circular and includes an inner circumferential surface, an outer circumferential surface, and an end sealing surface at a remote end thereof defined between said inner circumferential surface and said outer circumferential surface, at least one of said inner circumferential surface of said second end of said dust boot seal including a plurality of slots formed therein;
wherein when said second end of said dust boot seal rotates within said annular groove in at least a first direction due to a pressure differential exerted across said dust boot seal, said plurality of slots are operative to provide fluid communication between an interior side and an exterior side of said second end of dust boot seal which enables air pressure within said sealed chamber to equalize to atmospheric pressure.

2. The disc brake assembly of claim 1 wherein said plurality of slots are formed on both said inner circumferential surface and said outer circumferential surface of said dust boot seal.

3. The disc brake assembly of claim 2 wherein when said second end of said dust boot seal rotates within said annular groove in a first direction due to a pressure differential exerted across said dust boot seal, said plurality of slots on one of said inner and outer circumferential surfaces are operative to provide fluid communication between said interior side and said exterior side of said second end of dust boot seal which enables air pressure within said sealed chamber to equalize to atmospheric pressure and when said second end of said dust boot seal rotates within said annular groove in a second opposite direction due to a pressure differential exerted across said dust boot seal said plurality of slots on the other one of said inner and outer circumferential surfaces are operative to provide fluid communication between said interior side and said exterior side of said second end of dust boot seal which enables air pressure within said sealed chamber to equalize to atmospheric pressure.

4. The disc brake assembly of claim 2 wherein said plurality of slots on said inner circumferential surface and said plurality of slots on said outer circumferential surface are staggered relative to each other.

5. The disc brake assembly of claim 2 wherein said plurality of slots on said inner circumferential surface and said plurality of slots on said outer circumferential surface each have the same configuration.

6. The disc brake assembly of claim 1 wherein said plurality of slots are formed on said inner circumferential surface of said dust boot seal.

7. The disc brake assembly of claim 1 wherein said plurality of slots are formed on said outer circumferential surface of said dust boot seal.

8. The disc brake assembly of claim 1 wherein said end sealing surface is a continuous, uninterrupted sealing surface.

9. The disc brake assembly of claim 1 wherein said first end of said dust boot seal includes a reinforcement ring disposed therein.

10. A disc brake assembly comprising:
a caliper having a recess formed therein;
a piston slidably disposed in said recess, said piston having an annular groove formed in an outer side wall thereof;
a flexible dust boot seal having a first end and a second end, said first end being generally L-shaped and disposed in an outboard end of said recess and the second end being generally circular shaped and disposed in said annular groove of said piston; and
a fluid seal disposed between said caliper and said piston to define a sealed chamber between said piston and said recess;
wherein said second end of said dust boot seal is generally circular and includes an inner circumferential surface, an outer circumferential surface, and an end sealing surface at a remote end thereof defined between said inner circumferential surface and said outer circumferential surface, at least one of said inner circumferential surface of said second end of said dust boot seal including a plurality of slots formed therein;
wherein when said second end of said dust boot seal rotates within said annular groove in at least a first direction due to a pressure differential exerted across said dust boot seal, said plurality of slots are operative to provide fluid communication between an interior side and an exterior side of said second end of dust boot seal which enables air pressure within said sealed chamber to equalize to atmospheric pressure.

11. The disc brake assembly of claim 10 wherein said plurality of slots are formed on both said inner circumferential surface and said outer circumferential surface of said dust boot seal.

12. The disc brake assembly of claim 11 wherein when said second end of said dust boot seal rotates within said annular groove in a first direction due to a pressure differential exerted across said dust boot seal, said plurality of slots on one of said inner and outer circumferential surfaces are operative to provide fluid communication between said interior side and said exterior side of said second end of dust boot seal which enables air pressure within said sealed chamber to equalize to atmospheric pressure and when said second end of said dust boot seal rotates within said annular groove in a second opposite direction due to a pressure differential exerted across said dust boot seal said plurality of slots on the other one of said inner and outer circumferential surfaces are operative to provide fluid communication between said interior side and said exterior side of said second end of dust boot seal which enables air pressure within said sealed chamber to equalize to atmospheric pressure.

13. The disc brake assembly of claim 11 wherein said plurality of slots on said inner circumferential surface and said plurality of slots on said outer circumferential surface are staggered relative to each other.

14. The disc brake assembly of claim 10 wherein said end sealing surface is a continuous, uninterrupted sealing surface.

15. The disc brake assembly of claim 10 wherein said first end of said dust boot seal includes a reinforcement ring disposed therein.

16. A disc brake assembly comprising:
a caliper having a recess formed therein;
a piston slidably disposed in said recess, said piston having an annular groove formed in an outer side wall thereof;
a flexible dust boot seal having a first end and a second end connected together by a plurality of flexible convolutions, said first end disposed in an outboard end of said recess and the second end disposed in said annular groove of said piston; and
a fluid seal disposed between said caliper and said piston to define a sealed chamber between said piston and said recess;
wherein said second end of said dust boot seal is generally circular and includes an inner circumferential surface, an outer circumferential surface, and an end sealing surface at a remote end thereof defined between said inner circumferential surface and said outer circumferential surface, said inner circumferential surface of said second end of said dust boot seal including a first plurality of slots formed therein and said outer circumferential surface of said second end of said dust boot seal including a second plurality of slots formed therein;
wherein when said second end of said dust boot seal rotates within said annular groove in a first direction due to a pressure differential exerted across said dust boot seal, said first plurality of slots are operative to provide fluid communication between an interior side and an exterior side of said second end of dust boot seal which enables air pressure within said sealed chamber to equalize to atmospheric pressure and when said second end of said dust boot seal rotates within said annular groove in a second opposite direction due to a pressure differential exerted across said dust boot seal said second plurality of slots are operative to provide fluid communication between said interior side and said exterior side of said second end of dust boot seal which enables air pressure within said sealed chamber to equalize to atmospheric pressure.

17. The disc brake assembly of claim 16 wherein said plurality of slots on said inner circumferential surface and said plurality of slots on said outer circumferential surface are staggered relative to each other.

18. The disc brake assembly of claim 16 wherein said plurality of slots on said inner circumferential surface and said plurality of slots on said outer circumferential surface each have the same configuration.

19. The disc brake assembly of claim 16 wherein said end sealing surface is a continuous, uninterrupted sealing surface.

20. The disc brake assembly of claim 16 wherein said first end of said dust boot seal includes a reinforcement ring disposed therein.

* * * * *